United States Patent Office 3,052,382
Patented Sept. 4, 1962

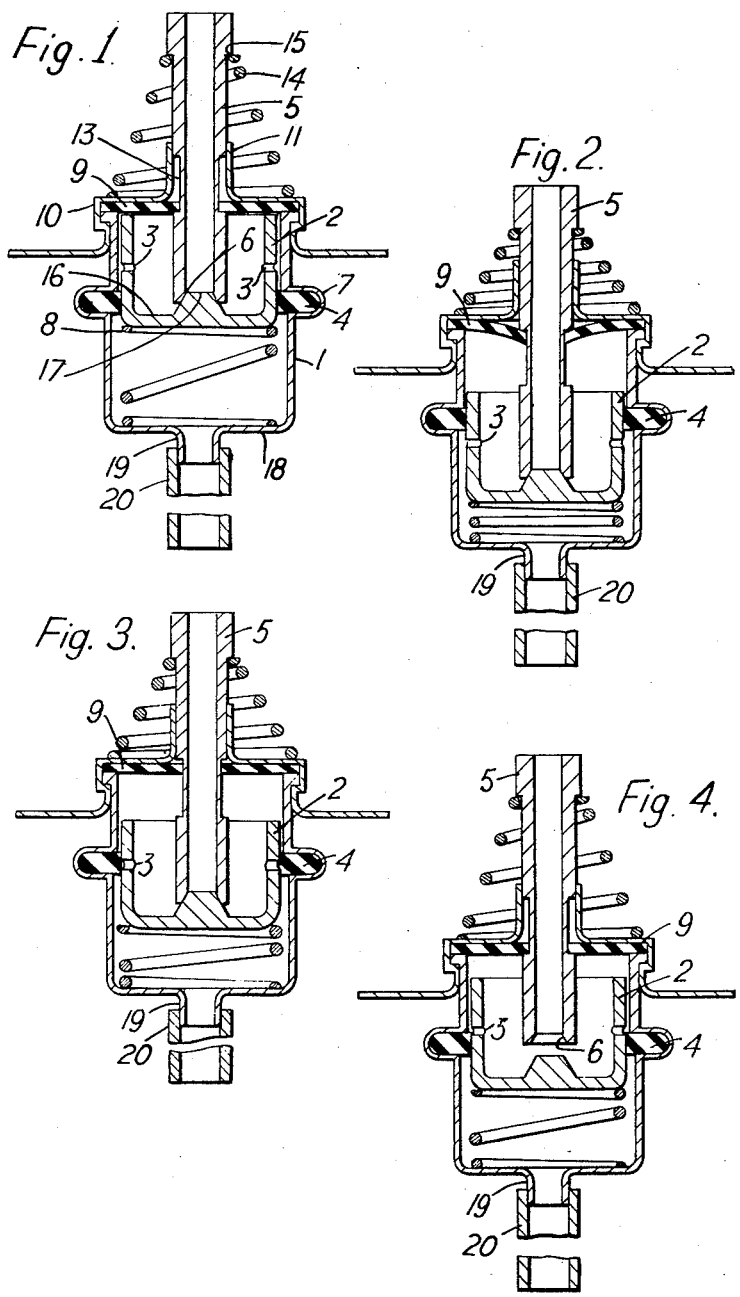

3,052,382
METERING DISPENSER FOR AEROSOL WITH FLUID PRESSURE OPERATED PISTON
Alan Gawthrop, Birstall, Leicester, England, assignor to Neotechnic Engineering Limited, Clitheroe, Lancashire, England, a British company
Filed Nov. 9, 1959, Ser. No. 851,677
Claims priority, application Great Britain Nov. 10, 1958
6 Claims. (Cl. 222—335)

This invention is for improvements in or relating to dispensing devices for aerosols and has for an object to provide a metering valve for delivering metered quantities of an aerosol composition.

Aerosol compositions generally are of two kinds, namely those in which the composition contains a propellant liquid, which vaporises very rapidly when the composition is at atmospheric pressure, and those in which the propulsion of the aerosol composition is effected by maintaining the liquid composition in a container under the pressure of a permanent gas, such as nitrogen.

Various prior constructions have been proposed for the dispensing of metered quantities of aerosol compositions having a number of moving parts and co-operating valves and it is an object of the present invention to provide a simplified construction of dispensing device for the delivery of metered quantities, particularly for the dispensing of aerosol compositions of the type which are ejected by the use of the pressure of a permanent gas.

According to the present invention, there is provided a dispensing device for delivering metered quantities of an aerosol composition which comprises a cylindrical chamber, adapted to be sealed into the neck of a container, closed at its outer end (with respect to the container) by a rubber or like elastic sealing washer and provided with an inlet at its inner end for communication with the interior of the container and having a sealing ring disposed circumferentially of the interior surface of its side wall at a point intermediate the outer and inner ends of the chamber, a piston member, preferably cup-shaped in form, disposed within said chamber so as to be reciprocable therein in engagement with said sealing ring, a discharge tube mounted in said sealing washer and extending therethrough to be engageable with the said piston member and to be sealed thereby, said discharge tube being resiliently biassed in an outward direction and being movable axially of the chamber so as, in one direction of movement, to depress the piston member to a position in which the piston member is no longer sealed by the sealing ring and, in the other direction of movement, to be separable from the piston member after the piston member has been sealed by the sealing ring, whereby the metered quantity of liquid in the outer part of the chamber is vented therethrough to atmosphere. Preferably, a compression spring is mounted within the chamber beneath the piston member so as to urge the piston member towards its outermost position when the discharge tube is in sealing engagement with the piston member and there is no pressure differential between the inner and outer parts of the cylindrical chamber.

A preferred form of the invention embodies a cup-shaped piston member disposed within the chamber with its open end towards the outer end thereof, said piston member being formed with a transfer port or ports in its side wall intermediate its open end and the bottom thereof, the piston member being movable by means of the discharge tube to position the transfer port below the sealing ring in communication with the inner end of the chamber to fill the outer end of the chamber, the venting of which is effected on the return movement when the discharge tube separates from the piston member on sealing of the transfer port by the sealing ring.

A feature of the invention consists in that the discharge tube is formed on its outer surface with a circumferential recess whose length axially of the discharge tube is greater than the thickness of the sealing washer, to provide a lost-motion connection between the discharge tube and the sealing washer.

The inlet at the inner end of the cylindrical chamber is preferably provided with a dip-tube for extending to the bottom of the container when the aerosol container is to be used in the upright position, that is to say with the discharge tube upwards.

The invention is illustrated by the two embodiments in the accompanying drawing in which:

FIGURES 1 to 4 are diagrammatic cross-sectional drawings showing the several operational positions of the dispensing device according to the invention.

In the operation of the preferred form of the device, shown in FIGURES 1 to 4, the cup-shaped piston member 2 normally is disposed in the uppermost position with its transfer port 3 or ports sealed from the contents of the container by the sealing ring 4 as seen in FIGURE 1. On depression of the discharge tube 5, the piston member 2 is moved downwardly in the cylindrical metering chamber 1 to a point at which the transfer ports 3 are open as seen in FIGURE 2, whereupon under the gas pressure within the container, the liquid is forced into the upper part of the metering chamber 1 and, when the pressure on the discharge tube 5 is released, it and the piston 2 move upwardly until the transfer ports 3 become sealed by the sealing ring 4 as seen in FIGURE 3, whereafter the discharge tube 5 moves relatively to the piston 2 so that its open inner end 6 becomes unsealed as seen in FIGURE 4, whereafter, owing to the pressure differential between the outer and inner parts of the chamber 1, the piston 2 is pressed into the outermost position and, in so doing, forces a metered quantity of liquid out through the discharge tube 5.

In the form of the construction of dispensing device in accordance with the present invention as illustrated in FIGURES 1 to 4, the dispensing device comprises a cylindrical chamber 1 which is distorted at about its midpoint 7 so as to accommodate an O-ring constituting a sealing ring 4 acting as a valve in conjunction with a cup-shaped piston member 2 slidable within the chamber 1. A compression spring 8 is disposed beneath the piston 2 within the chamber 1 and the chamber 1 is closed at its outer end by a rubber washer 9 which is clamped or otherwise sealed in position by means of a cap 10. The cap 10 and the washer 9 are each formed with a central hole 11, 12 through which a discharge tube 5 extends, the discharge tube being formed with a circumferential recess 13 which is of such an axial length as to provide for lost-motion between the discharge tube 5 and the washer 9. The discharge tube 5 is spring-pressed in an outward direction conveniently by means of a spring 14 engaging a recess 15 on the discharge tube 5 and resting upon the cap 10.

The bottom wall 16 of the cup-shaped piston member 2 is formed with an upstanding conical projection 17 which is engageable with the open inner end 6 of the discharge tube 5 so as to provide a seal. In the bottom wall 18 of the cylindrical chamber 1 there is formed an inlet port 19 connected to a dip tube 20, the whole assembly being mounted in the neck of a container filled with an aerosol composition and with a permanent gas, for example nitrogen, under pressure.

In operation, due to the pressure of the gas within the container, the whole of the cylindrical chamber 1, including the interior of the cup-shaped piston 2 is filled with liquid. On application of manual pressure to the discharge tube 5 in a direction to thrust it into the cylindrical chamber 1, the cup-shaped piston member 2 is forced downwardly and the rubber washer 9 is also distorted downwardly by the suction effect of the downward movement of the piston.

When the transfer ports 3, which are formed in the side wall of the cup-shaped piston member 2 approximately half way down the side wall, pass below the sealing ring 4, the gas pressure within the container forces liquid up the dip tube 20 into the lower part of the cylindrical chamber 1 and through the transfer port 3 into the part of the chamber above the cup-shaped piston member 2, the washer 9 being thereby forced to move on the recess 13 on the outside of the discharge tube 5 into its uppermost position in said recess as seen in FIGURE 3. On completion of the filling of the upper part of the cylindrical chamber 1, manual pressure on the discharge tube 5 is removed allowing the cup-shaped piston member 2 to rise to the point at which the transfer ports 3 in its side wall are sealed by the sealing ring 4. Continued outward movement of the discharge tube 5 now takes place under the influence of the spring 14 acting thereon, with the result that the lower end 6 of the discharge tube 5 becomes separated from the conical projection 17 on the bottom wall 16 of the cup-shaped piston member 2, as a result of which the upper part of the cylindrical chamber 1 is now at atmospheric pressure and there is a pressure differential between the two sides of the piston due to the gas pressure within the container.

The piston 2 is thus forced upwardly, in so doing acting as a pump and ejecting a measured quantity of liquid from the upper part of the chamber through the discharge tube 5 to atmosphere; at the conclusion of its upward movement, the projection 17 on the bottom wall 16 of the piston 2 re-engages with and seals the open inner end 6 of the discharge tube 5, whereby the liquid in the container, including the liquid retained in the outer part of the cylindrical chamber 1 within the cup-shaped piston member 2, is sealed off from contact with the atmosphere.

It will be appreciated that a number of modifications may be made in the construction described above without departing from the essential features of the invention, such departure including the provision of a spring-bias for the discharge tube within the outer part of the cylindrical chamber and the substitution of the projection on the bottom wall of the piston by a recess therein into which recess the open inner end of the discharge tube fits in liquid-tight manner to form a seal therefor.

The term "aerosol composition" as employed herein includes compositions other than simple liquids such as pastes, which may be discharged in the form of a coherent ribbon or stream, and viscous liquids which may be discharged in the form of a jet or a series of large drops and is not limited to compositions which are discharged in the form of the very minute droplets normally referred to as aerosols in the art to which the present invention relates.

Usually, the discharge tube will be provided with an actuator in the form of a nozzle member so constructed as to discharge the aerosol composition in the form of a jet, spray or ribbon and to provide a conveniently shaped end part to which manual pressure can be applied to operate the valve.

I claim:
1. A dispensing device for delivering metered quantities of an aerosol composition which comprises a cylindrical chamber, adapted to be sealed into the neck of a container, closed at its outer end with respect to the container by an elastic sealing washer and provided with an inlet at its inner end for communication with the interior of the container and having a sealing ring disposed circumferentially of the interior surface of its side wall at a point intermediate the outer and inner ends of the chamber, a piston member disposed within said chamber so as to be reciprocable therein in sealing engagement around its sides with said sealing ring, said piston member having at least one aperture therein extending from a point in the external side wall surface intermediate the ends of the piston and in communication with the outer end of the chamber, a discharge tube mounted in said sealing washer and extending therethrough to be engageable with the said piston member and to be sealed thereby, said discharge tube being resiliently biassed in an outward direction and being movable axially of the chamber so as, in one direction of movement, to depress the piston member to a position in which the piston member is no longer sealed by the sealing ring, and in the other direction of movement, to be separable from the piston member after the piston member has been sealed by the sealing ring, whereby the metered quantity of liquid in the outer part of the chamber is vented therethrough to atmosphere.

2. A dispensing device according to claim 1 wherein the piston member is cup-shaped.

3. A dispensing device according to claim 2, wherein a compression spring is mounted within the chamber beneath the piston member so as to urge the piston member towards its outermost position.

4. A dispensing device for delivering metered quantities of an aerosol composition, which comprises a cylindrical chamber adapted to be sealed into the neck of a container, closed at its outer end with respect to the container by an elastic sealing washer and provided with an inlet at its inner end for communication with the interior of the container and having a sealing ring disposed circumferentially of the interior surface of its side wall at a point intermediate the outer and inner ends of the chamber, a cup-shaped piston member disposed within the chamber with its open end towards the outer end of the chamber and being reciprocable in the chamber in sealing engagement around its sides with said sealing ring, said piston member having a transfer port in the side wall thereof intermediate its open end and the bottom thereof, a discharge tube mounted in said sealing washer and extending therethrough and engageable with said piston member and adapted to be sealed thereby, said discharge tube being resiliently biassed in an outward direction and being movable axially of the chamber so as, in one direction of movement, to depress the piston member to a position in which the piston member is no longer sealed by the sealing ring, and in the other direction of movement, to be separable from the piston member after the piston member has been sealed by the sealing ring, and a compression spring mounted within the chamber beneath the piston member and urging the piston member toward the outermost position, whereby when the discharge tube is separated from the piston member the outer part of the chamber is vented to the atmosphere.

5. A dispensing device according to claim 4, wherein the discharge tube is formed on its outer surface with a circumferential recess whose length axially of the discharge tube is greater than the thickness of the sealing washer, to provide a lost-motion connection between the discharge tube and the sealing washer.

6. A dispensing device according to claim 5 wherein the inlet to the chamber is provided with a dip-tube.

References Cited in the file of this patent
UNITED STATES PATENTS

| | | |
|---|---|---|
| 1,870,188 | Abrams | Aug. 22, 1932 |
| 2,835,417 | Kiraly | May 20, 1958 |
| 2,856,105 | Ward | Oct. 14, 1958 |